DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 21, 1972

896 O.G. 833

T896,041
AUTOMATIC DISCONNECT MEANS FOR A LIGHTNING ARRESTER

Arthur A. Olsen, Pittsfield, Mass., assignor to General Electric Company

Filed Feb. 22, 1971, Ser. No. 117,231
Int. Cl. H01h *31/00*
U.S. Cl. 200—48
1 Sheet Drawing. 12 Pages Specification

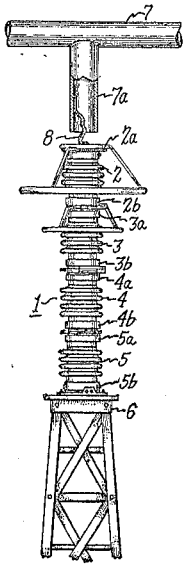

An automatic disconnect means is provided for mechanically separating, or opening, a circuit connecting a station-type lightning arrester to an overhead bus bar arrangement. The automatic disconnect means is characterized by being responsive to a failure of the arrester that causes the arrester housing to fall away from the overhead bus to which it is connected. The disconnect means operates to prevent mechanical loading of the bus due to the weight of all, or a portion, of the arrester housing remaining connected to it after such a failure.

March 21, 1972 A. A. OLSEN T896,041
AUTOMATIC DISCONNECT MEANS FOR A LIGHTNING ARRESTER
Filed Feb. 22, 1971
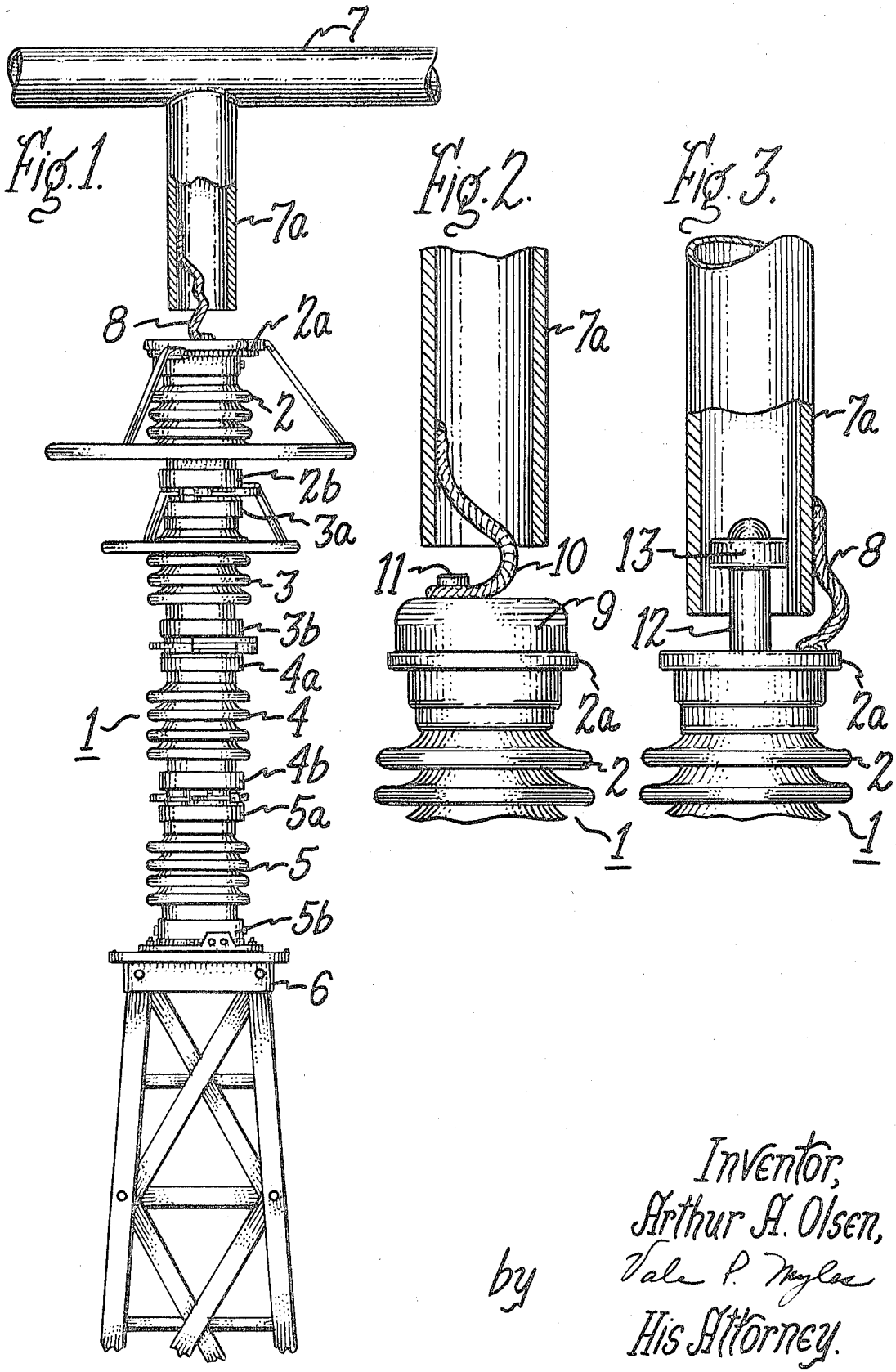
Inventor,
Arthur A. Olsen,
by Vale P. Myles
His Attorney.